United States Patent [19]  
Jain et al.

[11] Patent Number: 4,859,711  
[45] Date of Patent: Aug. 22, 1989

[54] HOLLOW MICROSPHERES

[75] Inventors: Mukesh Jain; Sadashiv Nadkarni, both of Jonquiere, Canada

[73] Assignee: Alcan International Limited, Montreal, Canada

[21] Appl. No.: 221,135

[22] Filed: Jul. 19, 1988

Related U.S. Application Data

[62] Division of Ser. No. 100,090, Sep. 23, 1987, Pat. No. 4,782,097.

[30] Foreign Application Priority Data

Oct. 1, 1986 [CA] Canada ................................. 519529

[51] Int. Cl.$^4$ .......................... C08J 9/32; B01J 13/02
[52] U.S. Cl. ..................................... 521/56; 521/58; 521/60; 521/64; 521/87; 521/89; 521/94; 521/141
[58] Field of Search ................... 521/56, 60, 58, 64, 521/87, 89, 94, 141, 149

[56] References Cited

U.S. PATENT DOCUMENTS 4,782,097 11/1988 Jain et al. .............................. 521/56

Primary Examiner—Morton Foelak  
Attorney, Agent, or Firm—Cooper & Dunham

[57] ABSTRACT

A process of forming hollow microspheres containing carbon or a polymer which is a carbon precursor. The process comprises forming a solution in a liquid solvent of a polymer having the following properties (a) a molecular weight of at least 10,000 and a long chain structure; (b) an ability to be coagulated by or precipitated from the solution by a non-solvent for the polymer; (c) an ability to form a continuous stretchable film when coagulated or precipitated from solution; (d) a chemical structure which is infusible or capable of being rendered infusible, and (e) a high carbon yield of at least 30% by weight upon being carbonized in a non-reactive atmosphere. An insoluble particulate blowing agent is incorporated into the solution and the solution is then divided into droplets and the droplets are introduced into a liquid bath containing a suitable non-solvent for the polymer. The non-solvent causes the polymer to precipitate or coagulate rapidly and simultaneously the blowing agent is decomposed to generate a gas within the droplets so that hollow microspheres are formed. The microspheres are then optionally subjected to carbonization in a non-reactive atmosphere at high temperature to convert the polymer to carbon. Uniformly-sized relatively large hollow microspheres can be produced by this process.

24 Claims, 3 Drawing Sheets

HOLLOW MICROSPHERES

This is a division of application Ser. No. 100,090 filed Sept. 23, 1987, now U.S. Pat. No. 4,782,097 issued Nov. 1, 1988.

BACKGROUND OF THE INVENTION

1. Field of the Invention

This invention relates to a process for producing hollow microspheres and to the hollow microspheres so produced. More particularly, the invention relates to the production of hollow microspheres containing or consisting entirely of carbon, and to the production of hollow microspheres which are precursors of such carbon-containing hollow microspheres.

2. Discussion of the Prior Art

Microspheres made of carbon and other materials have numerous uses in industry. For example, they can be used for the preparation of metal foams and syntactic foams (hollow carbon spheres in a polymer matrix), for the formation of filter beds and for the production of lightweight carbon composites. One known method of producing carbon microspheres involves the carbonization of pellets made from pitch (Y. Amagi et. al. "Hollow Carbon Microspheres from Pitch Material and their Applications," SAMPLE 10th National Symposium 71), but pitch pellets can fuse together during carbonization unless steps are taken to avoid this by a time-consuming and expensive pretreatment.

Another method of forming hollow microspheres is disclosed in U.S. Pat. No. 2,797,201 to Veatch et. al. issued on June 25, 1957. This method involves forming droplets of a solution in a volatile solvent of a gas-generating material and a film-forming polyvinyl alcohol or phenolformaldehyde resin, and heating the droplets by a spray drying technique to form hollow microspheres of 1–500$\mu$ in size. However, this process does not result in particles of a uniform size and, indeed, is not effective at all for producing microspheres larger than about 0.5 mm (500$\mu$) in diameter. This is because almost 70–85% of each droplet consists of solvent, so that, during the spray drying step, a large amount of heat must be transferred to the droplet in a short period of time in order to vaporize the solvent completely. This must take place while gas is being generated within the droplets and during the short time the droplets remain out of contact with each other, otherwise agglomeration will take place. All of this is extremely difficult in a spray drying system when the droplets exceed a certain maximum size.

SUMMARY OF THE INVENTION

Accordingly, it is an object of the present invention to provide an improved process for forming hollow microspheres, and particularly those having a diameter exceeding about 0.5 mm.

According to one aspect of the invention there is provided a process of forming hollow microspheres, which comprises: forming a solution in a liquid solvent of a polymer having the following properties: (a) a molecular weight of at least 10,000 and a long chain structure of at least 200 monomer units; (b) an ability to be coagulated or precipitated from the solution upon contact of the solution with a non-solvent for the polymer; (c) an ability to form a continuous stretchable film when coagulated or precipitated from solution; (d) a chemical structure which is infusible or which is capable of being rendered infusible; and (e) a high carbon yield of at least 30% by weight upon being carbonized in a non-reactive atmosphere; incorporating into said solution an insoluble solid particulate blowing agent which is decomposable by heat to generate a gas; dividing the solution into droplets and introducing the droplets into a liquid bath containing a non-solvent for the polymer, said non-solvent being such that the polymer is rapidly coagulated or precipitated from said solution, and said bath having a temperature high enough to cause decomposition of the blowing agent; and removing the resulting hollow microspheres from the bath.

The hollow microspheres produced in this way are socalled "green" microspheres because they contain a polymer which must be converted to carbon by a subsequent step if carbon-containing microspheres are required. However, the green microspheres may themselves be a useful product and consequently, in some cases carbonization of the green microspheres may not be required.

If carbon-containing microspheres are required, they can be prepared by heating the green microspheres in a non-reactive atmosphere to a temperature usually in excess of about 500° C. As will be explained later, however, the green microspheres may have to undergo a treatment to render the polymer infusible prior to the carbonization treatment.

The invention is capable of producing hollow green or carbon-containing microspheres of a uniform size of about 0.5 mm (500$\mu$) or larger having a high degree of sphericity.

DETAILED DESCRIPTION OF THE PREFERRED EMBODIMENTS

Figure 1:
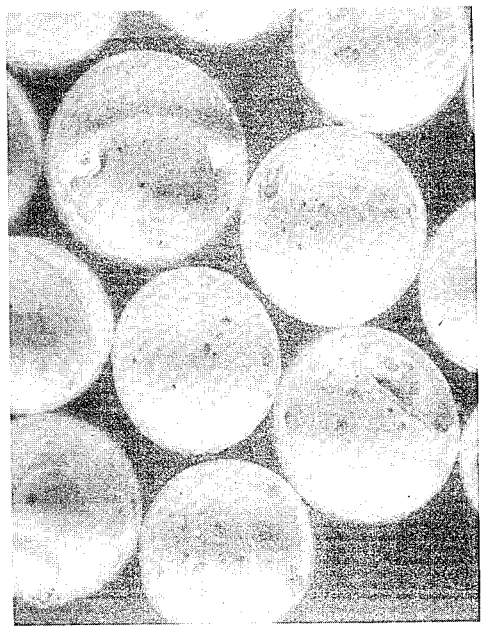
FIGS. 1 to 4 are photomicrographs of sectioned microspheres produced by the present invention, as indicated in the Examples.

The polymer selected for use in the present invention must have certain characteristics as described above. These requirements and their importance are explained in more detail below.

The polymer should have a molecular weight of at least 10,000, and preferably about 50,000 to 100,000 or more, and a long chain structure which may be branched or straight, although substantially straight chain structures are preferred. By the term "long chain structure" we mean a polymer comprising, on average, at least about 200 monomer units and preferably about 1000 monomer units or more. High molecular weight long chain polymers are capable of forming stable and uniform suspensions when the solid particulate blowing agent or other solid material (if required) is introduced into the polymer solution.

It is theorized that the long polymer chains encircle the individual particles and overcome any tendency of the particles to settle or agglomerate. The reduced tendency of the particles to settle or segregate is important because identically-sized droplets produced by dividing the polymer solution then contain equal amounts of the blowing agent and other solid (if present). Uniformity sized hollow microspheres of the same composition can consequently be formed.

The polymer must be capable of being rapidly coagulated or precipitated from its solution when the solution is contacted with a suitable non-solvent for the polymer.

Coagulation or precipitation must be quite rapid because an impermeable polymer skin must form at the surface of the droplet before (or simultaneously with) the decomposition of the blowing agent so that hollow microspheres can be formed. The choice of a suitable solvent/non-solvent system for the polymer is important and is described in more detail later.

The polymer must be capable of forming a continuous stretchable film when coagulated or precipitated from its solution. This is because the impermeable polymer skin formed at the surface of each droplet is stretched and inflated by the gases generated by the blowing agent. Generally, high molecular weight long chain polymers have this ability.

The polymer should be of a kind which can be carbonized without melting, i.e. the gases produced by heating the polymer in a non-oxidizing atmosphere should be evolved from a solid rather than a liquid. This is important because microspheres which tend to melt may fuse together during carbonization or their surfaces may become misshapen. Furthermore, if the coagulated or precipitated polymer contains an added particulate material uniformly dispersed throughout the polymer, the particles of this material may be undesirably displaced by the evolving gases if the polymer melts while being carbonized. When the polymer remains solid, any added solid particles remain fixed in their original locations.

Polymers which tend to fuse when heated may be used in the present invention if they can be treated prior to the carbonization step in a way which renders the polymers infusible. For example, some polymers become infusible when cross-linked or cyclized, e.g. by being heated at non-oxidizing temperatures in an oxygen-containing atmosphere or by being subjected to the action of a chemical oxidizing agent (e.g. an oxygen-containing compound of a metallic transition element). This is referred to hereinafter as a stabilization treatment and, when required, is carried out after the hollow microspheres have been removed from the bath but prior to the carbonization step.

Furthermore, the polymers should have a high carbon yield of at least 30% by weight, and more preferably at least 40% by weight, upon being carbonized in a non-reactive atmosphere. This is to ensure that, following carbonization of the microspheres, they contain a suitably large amount of carbon. If the carbon yield is too low, the carbonized microspheres may be too porous and fragile. Polymers having a lower carbon yield than 30% by weight may be used in the invention if they can be modified to increase the carbon yield to the stated minimum or more.

Generally speaking, treatments which render a polymer infusible also increase its carbon yield. For example, cross-linking and cyclization makes it less likely that low molecular weight carbon-containing components will separate from the polymer mass and volatilize when the polymer is undergoing the carbonization step. Consequently, polymers of low carbon yield which can undergo a stabilization step may be suitable for the present invention.

Additionally, as a practical matter, the polymer must be sufficiently soluble in the solvent to produce a solution which contains a suitably high polymer content and which can be readily divided into droplets. For ease of droplet formation, the polymer solution (after additional materials have been incorporated therein, if required) preferably has a viscosity of 200–5000 cp at 25° C., and more preferably 500–2000 cp at 25° C. Very high viscosities make division of the solution quite difficult and result in droplets having a "tail" and thus in the production of non-spherical hollow particles. Very low viscosities usually mean that there is insufficient polymer in the solution. The amount of polymer dissolved in the solution should be sufficient to enable hollow microspheres to be formed. That is, if the polymer content is too low, the walls of the spheres will be too thin and too permeable to contain the gas generated by the blowing agent. The minimum polymer content depends on the polymer employed and on other conditions, but it is usually about 5% by weight based on the total weight of the solution.

The preferred polymers for use in the present invention are polyacrylonitrile and its copolymers and terpolymers (collectively referred to hereinafter as PAN), cellulose and its derivatives, polyvinyl alcohol and its copolymers and terpolymers, polyarylether, polyacenaphthylene, polyacetylenes, and the like. Suitable materials are also disclosed in "Precursors for Carbon and Graphite Fibers" by Daniel J. O'Neil, Intern. J. Polymeric Meter Vol. 7 (1979), p. 203.

PAN is the most preferred material for use in the present invention. PAN is a known polymer widely used for textiles, for the production of carbon fibres and for other purposes. For example, it is sold under the trade mark ORLON by E. I. DuPont de Nemours and Company, and the structure of this particular product is disclosed in an article by R. C. Houtz, Textile Research Journal, 1950, p. 786. Textile grade PAN is commonly a copolymer of polyacrylonitrile and up to 25% by weight (more commonly up to 10% by weight and usually about 6% by weight) of methacrylate or methylmethacrylate. Textile grade PAN copolymers can be used in the present invention and are in fact preferred to PAN homopolymer because the additional units in the copolymer assist in the cyclization of the polymer when heat stabilization is carried out to make the polymer infusible. Inexpensive waste PAN from the textile industry, such as the so-called "dryer fines", are particularly useful in the invention.

Suitable solvents for PAN include dimethylformamide (DMF), dimethylsulfoxide (DMSO) and dimethylacetamide (DMAC). DMF is the preferred solvent and solutions of the required viscosity can be made by dissolving a sufficient amount of PAN in DMF to give a solution containing 5–20% by weight, more preferably 8–16% by weight, and most preferably 12–15% by weight of PAN.

When cellulose or a cellulose derivative (e.g. the textile material sold under the trademark RAYON) is used as the polymer, a mixture of about 10% by weight of LiCl in DMF may be used as a solvent. It is found that the LiCl acts as a solubilizing aid which increase the solubility of cellulose in DMF. When polyvinylalcohol is used as the polymer, DMF is a suitable solvent. Suitable solvents are also available for the other polymers mentioned above.

When a solution of the polymer in the solvent has been formed, a heat-decomposable blowing agent is incorporated into the solution before the solution is contacted with the non-solvent. The blowing agent is in the form of a finely divided solid which is insoluble in the polymer solution. As stated above, the nature of the polymer is such that the particles of the blowing agent are held in a uniform suspension in the polymer solution, so that droplets of equal size contain the same amount of blowing agent and thus produce microspheres of substantially identical size. Preferably, the solid blowing agent is used in the form of particles of less than 100 Tyler mesh in size. However the size of the particles is less important than the requirement that they be uniformly dispersed so that, upon division of the solution, each droplet of solution contains the same amount of blowing agent as all of the other droplets.

Examples of solid blowing agents which may be employed in the present invention are $(NH_4)_2CO_3$, $NH_4HCO_3$ and ammonium carbamate.

The amount of blowing agent employed depends on the polymer, the concentration of the solution etc., but is usually in the range of 1–5% by weight of the polymer solution.

As well as the blowing agent, additional solid particles which are non-reactive with the polymer and solvent may be incorporated into the polymer solution. For example, it may be desirable to produce microspheres which contain fine coke dust, metals, metal oxides, metal fluorides (e.g. $AlF_3$), activated carbon and the like. These materials may be added to the solution in any quantities which do not affect the ability of the polymer solution to form hollow microspheres.

Materials which are soluble in the polymer solution may also be added, if desired. For example, tar, pitch or phenolic resins may be incorporated into the polymer solution. This may be desirable because such materials are inexpensive and their presence is not harmful if the quantities are kept low enough not to adversely affect the desired chracteristics of the polymer.

Since PAN is a good film-former, it may incorporate a large proportion of additional solids, e.g. up to 10 parts by weight of additional solids per part by weight of PAN. PAN may also accommodate up to 1 part by weight of tar or pitch per part by weight of PAN. It is found that the presence of the tar or pitch in such amounts does not make the particles fusible owing to the presence of the PAN.

The polymer solution containing the blowing agent and additional materials (if any) is divided into droplets of equal size which are then introduced into a non-solvent bath. The droplet formation can be carried out, for example, by feeding the solution through a hollow tube (e.g. 1–3 mm in diameter) and allowing droplets of solution to fall from the end of the tube into the bath. Alternatively, a vibrating rod may be used to form the droplets, e.g. by allowing a stream of the polymer solution to run down the rod as it vibrates.

The choice of an appropriate non-solvent for use in the bath is important. The non-solvent should be readily miscible with the solvent, but should be capable of precipitating or coagulating the polymer virtually instantaneously. This is necessary to permit the polymer to form a stretchable film at the surface of the droplet at the same time that the blowing agent is decomposed. The resulting droplet is then inflated to form a hollow microsphere. If the precipitation or coagulation takes place too slowly, the gases will escape and the droplet will remain uninflated. Generally, it has been found that non-solvents which do not tend to wet the polymer solution (i.e. those forming a low contact angle with the polymer solution) allow the droplets of polymer solution to remain spherical and thus permit the formation of hollow microspheres having good sphericity. However, it has also been found that the identity of the solvent can also affect the choice of a suitable non-solvent. Thus, for every polymer solution used in the present invention, a suitable non-solvent must be located and this can be done by simple trial and experimentation.

When PAN is used as the polymer and DMF is used as the solvent, the non-solvent may be water or methanol. Suitability as a non-solvent for the PAN/DMF system appears to be associated with a high polarity and the presence of —OH groups. Acetone, for example, is not suitable as a non-solvent for the PAN/DMF system because the coagulation or precipitation of the polymer is not sufficiently rapid.

Since water is inexpensive, it is the preferred non-solvent, but the bath preferably comprises 0–80% by weight of the solvent (DMF) in water, more preferably 25–60% by weight and usually about 40% by weight of DMF when the method commences.

When the polymer is cellulose or a derivative thereof in a DMF solution containing 10% LiCl, the non-solvent may be water.

Polyvinyl alcohol in particular illustrates the point that the choice of the solvent and non-solvent is extremely important for the production of suitable hollow microspheres. Polyvinyl alcohol can be dissolved in either water or DMF, and methyl ethyl ketone can be used as a non-solvent. However, when water is used as the solvent, spherical microspheres are not obtained. On the other hand, when DMF is used as a solvent, spherical microspheres are obtained, showing that it is important to select the right solvent/non-solvent combination.

The temperature of the bath should be above the decomposition temperature of the blowing agent and below the boiling temperature of the bath (boiling of the bath causes deformation of the microspheres). Preferably, the maximum temperature of the bath should be 10°–20° C. below its boiling temperature. Incidentally, by choosing a blowing agent having a decomposition temperature of at least 25° C., the polymer solution can be prepared and delivered to the bath at room temperature, which is a considerable convenience.

The bath temperature is normally in the range of 50°–70° C. when the polymer solution is PAN dissolved in DMF, the bath comprises DMF and water and ammonium bicarbonate is used as the blowing agent.

Although the identity of the non-solvent is primarily responsible for determining the rate of coagulation or precipitation of the polymer from solution, the conditions of the bath, i.e. its composition and its temperature, also have some effect. The bath conditions also affect the time and rate of decomposition of the blowing agent and the stretchability of the coagulated or precipitated polymer. The ideal conditions for each system can be found by simple trial, but the following guidelines are provided.

The rate of coagulation or precipitation of the polymer from the solution can be varied by changing the ratio of non-solvent to solvent in the bath. When the ratio is increased, the speed of coagulation or precipitation is increased. However, the bath preferably contains at least 25% by weight of the solvent at the start of the procedure so that the solvent extracted from the droplets as the coagulation or precipitation step proceeds does not cause a large percentage changes in the solvent concentration in the bath, which can affect the rate of polymer coagulation or precipitation. Alternatively, the concentration of the solvent in the bath can be kept constant by adding non-solvent to the bath at a suitable rate. The rate and amount of gas generated by the blowing agent can be controlled by adjusting the bath temperature and the amount of blowing agent used in the solution. The viscosity of the polymeric solution can be varied by changing the concentration of the polymer in the solution. The droplet size can be varied quite easily according to the method employed for dividing the solvent. For example, the size of droplets formed at the end of a hollow tube depends on the diameter of the tube and to some extent on the viscosity, temperature and composition of the solution. By suitably adjusting the above factors, the size and wall thickness of the microspheres can be varied.

Since the droplets of polymer solution can be made of uniform size and each contains a substantially identical amount of blowing agent, microspheres of very uniform size can be produced (e.g. microspheres having a uniformity in terms of the sizes of their diameters of 5–10%). Moreover, since the droplets are inflated from within by the blowing agent gases to form hollow microspheres, a product having a high degree of sphericity can be obtained, e.g. the microspheres may have a sphericity of 0.95 or more.

The use of a non-solvent bath to cause simultaneous coagulation and blowing of the droplets enables large sized hollow microspheres to be produced, which is difficult or impossible by other techniques. Generally, the particles produced by the present invention have diameters of 0.5 mm and larger. Microspheres having diameters smaller than 0.5 mm are difficult to obtain by this technique because very small droplets may tend to float on the bath surface and become deformed. The practical upper size limit is about 10 mm, although theoretically larger particles could be obtained. The most common size range of the microspheres is 0.5–5 or 6 mm (diameter).

The use of a non-solvent bath to form the microspheres also has the advantage that the temperatures employed are quite low, so no degradation of the polymer takes place.

Once the microspheres have been formed they can be removed from the bath and have no tendency to agglomerate since the polymer has been precipitated or coagulated to form a non-tacky solid. The microspheres are then preferably dried under gentle heating, e.g. at about 100° C. in air.

The resulting polymer microspheres (the so-called "green" microspheres) may in themselves be a useful product, in which case no further treatment may be required. More usually, however, the green microspheres are subjected to a further treatment which includes a carbonization step to convert the polymer to carbon.

The exact nature of the subsequent treatment of the microspheres when carbonization is required depends on the type polymer present. If the polymer is already in a non heat-fusible form, the microspheres may be subjected directly to the carbonization treatment. However, the polymer may first require heat stabilization, i.e. cross-linking or cyclisation, to make it infusible.

PAN, for example, requires a heat stabilization treatment prior to the carbonization step in order to make the polymer infusible. The heat stabilization step causes the PAN polymer to cyclize, as follows:

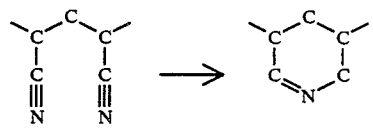

The heat stabilization also increases the oxygen content of the polymer, which improves the carbon yield by increasing the extent of aromatization and cross-linking codal aromatization. The heat stabilization of PAN is carried out by heating the polymer in air or oxygen at a temperature of about 200°–210° C. for several hours, e.g. 8–16 hours.

The carbonization step can then be carried out. This involves heating the microspheres in a non-reactive atmosphere (e.g. under argon or nitrogen) for a period of up to several hours at a temperature in the range of 500°–700° C., preferably at a heating rate of 100° C. per hour or more. This heating step converts the polymer to carbon and to volatile gases, which are driven off.

The following Examples and Comparative Examples provide further explanation of the present invention. In the Examples and Comparative Examples, percentages are by weight unless otherwise specified.

EXAMPLE 1

Polyacrylonitrile (PAN) copolymer sold under the trade mark ORLON was dissolved in DMF (dimethyl formamide) to make a 14% (w/w) solution having a viscosity of 1300 cps at 25° C. Approximately 2% (by weight of solution) of finely ground (−100 mesh) $(NH_4)_2CO_3$ was uniformly suspended in this by stirring. This suspension was pumped through an orifice of 2 mm diameter to produce droplets at the rate of about 40 drops per minute. These were allowed to fall from a height of 30 cms into a bath containing 40% DMF in water maintained at about 60° C. The $(NH_4)_2CO_3$ decomposed at this temperature to produce $NH_3$ and $CO_2$. The DMF being miscible with water diffused out of the droplets while water diffused inside precipitating the polymer. As these two processes occurred simultaneously the gases produced inflated the precipitating polymer to form hollow spheres of PAN. These spheres were then washed to remove traces of DMF and then dried in an oven under a vacuum at 75° C.

The spheres produced were uniform in size with an average diameter of 4.3 mm and had an average wall thickness of 0.22 mm.

These spheres were stabilized in air at 210° C. for 16 hours and carbonized in $N_2$ at 600° C. at a heating rate of 30° C. per hour in a Lindberg furnace.

The final average diameter of the carbon spheres was 2.8 mm with an average wall thickness of 0.20 mm.

Figure 2:
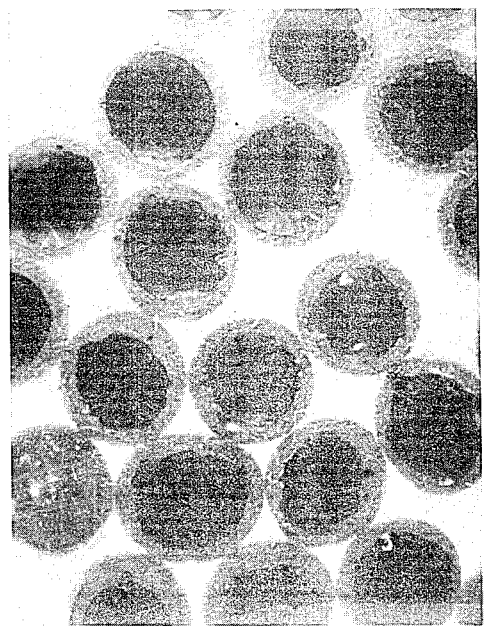

The sectioned green microspheres are shown in FIG. 1 in magnified (7.5×) form, and the sectioned carbonized microspheres are shown in FIG. 2 at the same magnification.

EXAMPLE 2

The other conditions being identical to those in Example 1, the polymer solution was pumped through an orifice of 0.5 mm diameter. The green spheres had an average diameter of 2.6 mm and the carbonized spheres had an average diameter of 1.7 mm.

EXAMPLE 3

A 12% PAN solution in DMF was prepared. In this coke dust (approximate size below 200 mesh) was dispersed to maintain a ratio of 1:1 of coke dust to PAN (viscosity 900 CP at 25° C.). $NH_4HCO_3$ (2%) was added and thoroughly dispersed. The suspension was pumped through an orifice of 2 mm diameter and divided into drops and precipitated in a 25% solution of DMF in water maintained at 60° C. The sphere diameter was 4.1 and, after carbonisation, 3.6 mm.

EXAMPLE 4

An 8% PAN solution in DMF was prepared. Activated carbon was dispersed in it so as to maintain a ratio of 4:1 of activated carbon:PAN. The suspension viscosity was 1800 cp at 25° C. $NH_4HCO_3$ was added to the extent of 2% by weight of suspension. The suspension was divided in drops and precipitated as in Example No. 3. The hollow spheres formed had surface areas as shown below:

After being Dried: 245 $m^2/g$
After being Carbonised (700° C.): 473 $m^2/g$

Figure 3:
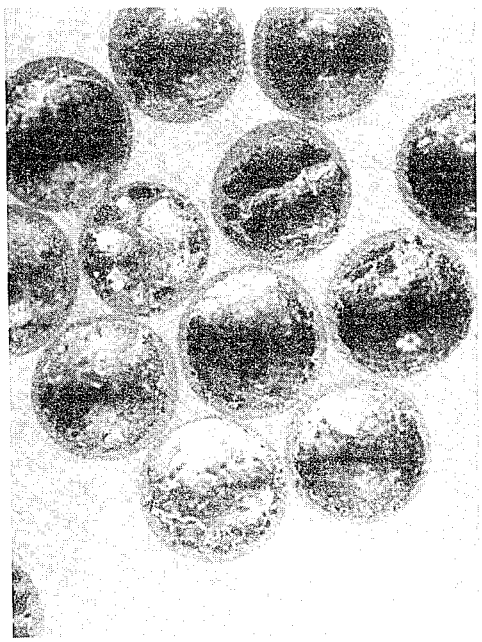
Figure 4:
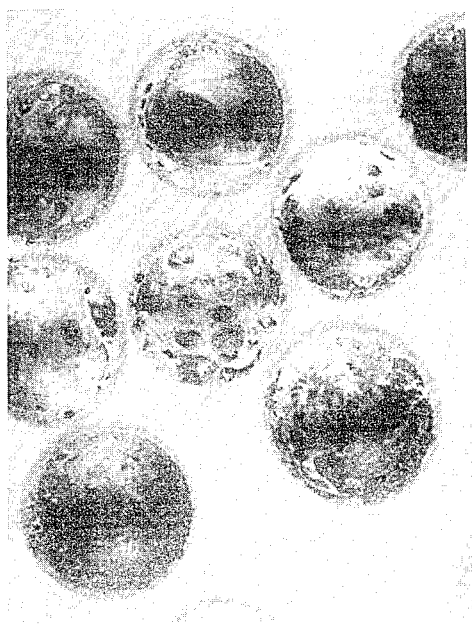

FIGS. 3 and 4 show sectional microspheres before and after carbonization, respectively. The magnification was 7.5× in both cases.

Figure 5:
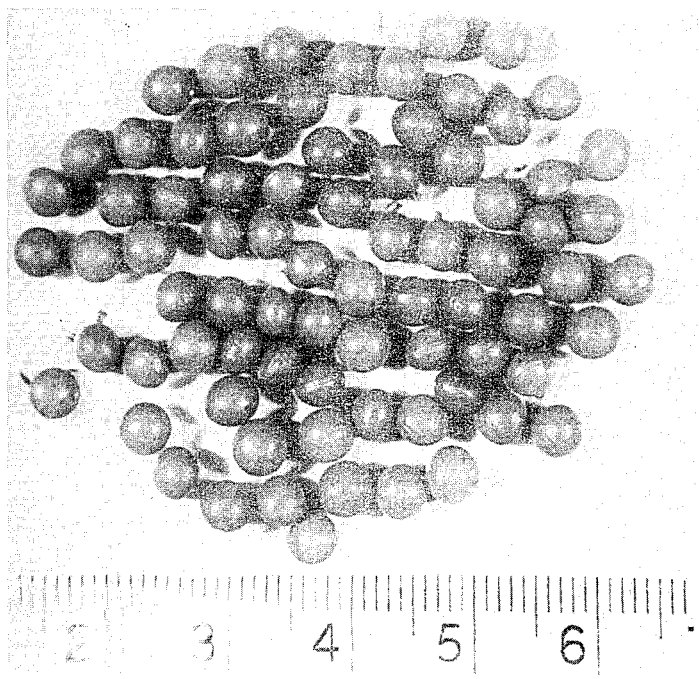
FIG. 5 is a photomicrograph of whole green microspheres produced according to the present invention.
Figure 6:
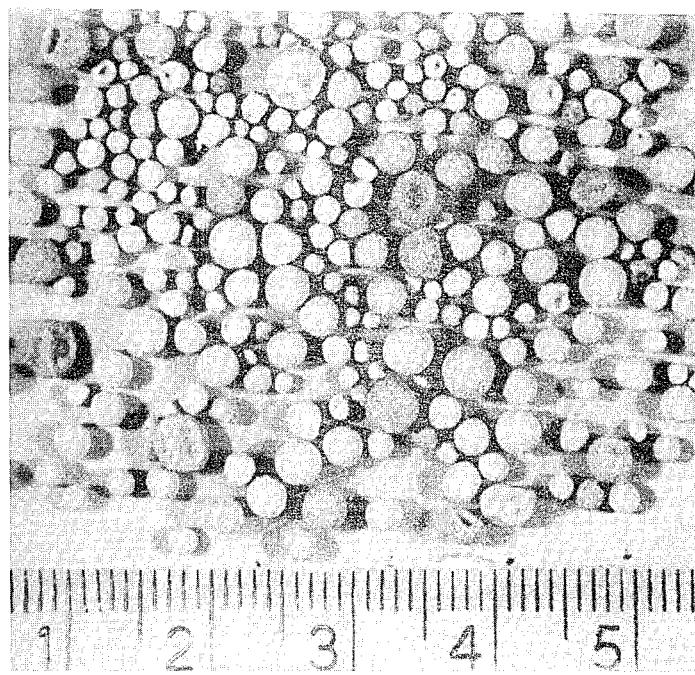
FIG. 6 is a photomicrograph of green microspheres produced by a process different from the present invention.

FIG. 5 shows the hollow green microspheres as they appear after being dried and, for comparison, FIG. 6 is a similar photograph of microspheres produced by coating polystyrene particles with a phenolic resin followed by heating to shrink the polystyrene core. It can be seen that the hollow microspheres produced by the present invention are of much more uniform size and shape. The scales shown in FIGS. 5 and 6 are centimeters (large divisions) and millimeters (small divisions).

EXAMPLE 5

Separate 10% solutions of PVA were prepared in water and in DMF and 2% of ammonium bicarbonate was added in each case and thoroughly dispersed. The solutions were precipitated in methyl ethyl ketone baths maintained at 60° C. after being divided into drops. In the first case PVA precipitated as a fibrous mass whereas in the latter case, hollow spherical microspheres were obtained.

This shows that methyl ethyl ketone is a suitable non-solvent when PVA is dissolved in DMF, but not when dissolved in water.

EXAMPLE 6

Sufficient cellulose was dissolved in DMF containing 10% of LiCl to form a 5% solution. Ammonium bicarbonate (2%, −100 Tyler mesh size) was dispersed in the solution and droplets were formed by passing the solution through an orifice of 2 mm in diameter. The droplets were allowed to fall into a water bath maintained at 60° C. Hollow spheres of cellulose were produced.

COMPARATIVE EXAMPLE 1

A phenol formaldehyde resin (NOVOLAK type) was dissolved in DMF to form 10% solution by weight. $NH_4HCO_3$ was added to the extent of 2% by weight of solution. The solution was divided in drops and precipitated in a bath containing water maintained at 60° C. No spheres formed; the drops burst into powder indicating unsuitability of low molecular weight polymers for the technique of the present invention.

COMPARATIVE EXAMPLE 2

A PAN solution of 12% by weight in DMF was prepared. $NH_4HCO_3$ was added to the extent of 2% by weight of solution. The suspension was divided into drops and precipitated in a bath containing acetone (acetone being a non-solvent for PAN and a solvent for DMF). The drops burst into a fibrous mass. No spheres were formed.

This shows that acetone is not a suitable non-solvent for a PAN in DMF solution.

COMPARATIVE EXAMPLE 3

A 12% solution of PAN in DMF was prepared. The solution was spray dried using a lab spray drier (Yamato, U.S.A.). The temperature in the drying chamber was varied between 100° to 300° C. In all cases, a fibrous mass was produced. No spheres could be obtained.

This shows that the spray drying technique as disclosed by Veatch et al in U.S. Pat. No. 2,797,201 is not suitable to form microspheres from the polymers used in the present invention.

COMPARATIVE EXAMPLE 4

A 10% solution of polyvinylalcohol (PVA), in water was prepared. This was passed through an orifice of 2 mm diameter and subdivided into droplets. These droplets were dropped through a vertical tube furnace maintained at 100° C. The drops agglomerated at the bottom of the furnace as the solvent could not be evaporated in a heating zone 3 feet in height.

This shows that solvent evaporation techniques cannot be used to form microspheres as in the present invention.

COMPARATIVE EXAMPLE 5

A 10% solution of PAN in DMF was prepared and fume silica was dispersed therein to obtain a ratio of silica to PAN of 6:8. This was sprayed using a lab spray drier (Bowen Eng. Inc., New Jersey). The temperature was varied between 100° C. and 200° C. A fibrous mass was obtained.

Again, this shows that spray drying techniques are not effective.

COMPARATIVE EXAMPLE 6

A 12% solution of PAN in DMF was prepared. A drop of the solution was added to acetone. No sphere was formed and the PAN precipitated as a fibrous mass which dispersed throughout the bath. A drop of the same solution was then added to a 40:60 DMF/water mixture. A PAN sphere was formed instantaneously.

This Comparative Example clearly demonstrates the necessity to select an appropriate non-solvent to cause virtual instantaneous precipitation. Without this, hollow microspheres cannot be formed.

What we claim is:

1. Microspheres having a diametric size in the range of ½-10 mm, produced by a process of forming hollow microspheres, which comprises:
   forming a solution in a liquid solvent of a polymer having the following properties:
   (a) a molecular chain weight of at least 10,000 and a long chain structure of at least 200 monomer units;

(b) an ability to be coagulated or precipitated from the solution upon contact of the solution with a non-solvent for the polymer;
(c) an ability to form a continuous stretchable film when coagulated or precipitated from solution;
(d) a chemical structure which is infusible or which is capable of being rendered infusible; and
(e) a high carbon yield of at least 30% by weight upon being carbonized in a non-reactive atmosphere;

incorporating into said solution an insoluble solid particulate blowing agent which is decomposable by heat to generate a gas;

dividing the solution into droplets and introducing the droplets into a liquid bath containing a non-solvent for the polymer, said non-solvent being such that the polymer is rapidly coagulated or precipitated from the solution, and said bath having a temperature high enough to cause decomposition of the blowing agent; and removing the resulting hollow microspheres from the bath.

2. Microspheres according to claim 1, wherein said polymer is selected from the group consisting of polyacrylonitrile and copolymers and terpolymers of acrylonitrile and other monomers copolymerizable therewith.

3. Microspheres according to claim 2 wherein said copolymers and terpolymers include up to 25% by weight of units derived from said monomers copolymerizable with the acrylonitrile.

4. Microspheres according to claim 2 wherein said copolymers and terpolymers include up to about 10% by weight of units derived from said monomers copolymerizable with the acrylonitrile.

5. Microspheres according to claim 2, which said monomers copolymerizable with the acrylonitrile are selected from the group consisting of methacrylate and methylmethacrylate.

6. Microspheres according to claim 2 wherein the liquid solvent is selected from the group consisting of dimethylformamide, dimethylsulfoxide and dimethylacetamide.

7. Microspheres according to claim 2 wherein the solvent is dimethylformamide.

8. Microspheres according to claim 7 wherein the non-solvent is selected from the group consisting of water and waterdimethylformamide mixtures.

9. Microspheres according to claim 1 wherein said polymer is selected from the group consisting of polyvinyl alcohol and its copolymers.

10. Microspheres according to claim 9 wherein said liquid solvent is dimethyl formamide.

11. Microspheres according to claim 10 wherein said non-solvent is methyl ethyl ketone.

12. Microspheres according to claim 1 wherein the viscosity of the solution is within the range of 200–5000 cp at 25° C.

13. Microspheres according to claim 1 wherein a particulate solid other than the blowing agent is introduced into the solution and uniformly dispersed therein before the solution is divided into droplets.

14. Microspheres according to claim 13 wherein said particulate solid comprises particles of a size less than 100 Tyler mesh.

15. Microspheres according to claim 13 wherein the particulate solid is selected from the group consisting of fine coke dusts, metals, metal oxides, metal fluorides, and activated carbon.

16. Microspheres according to claim 15 wherein the particulate solid is $AlF_3$.

17. Microspheres according to claim 1 wherein a soluble material is dissolved in the polymer solution before the solution is divided into droplets.

18. Microspheres according to claim 17 wherein said soluble material is selected from the group consisting of tar, pitch and phenolic resins.

19. Microspheres according to claim 1 wherein the solution is divided into droplets by feeding the solution through a hollow tube and allowing droplets to fall from a free end of said tube.

20. Microspheres according to claim 1 wherein the temperature of the bath is below the boiling point of the non-solvent.

21. Microspheres according to claim 1 wherein the hollow microspheres removed from the bath are dried by heating them gently in air.

22. Microspheres according to claim 1 wherein the polymer used to form the solution is heat-fusible but capable of being rendered infusible, and wherein the hollow microspheres removed from the bath are subjected to a treatment which renders the polymer infusible.

23. Microspheres according to claim 2 wherein the hollow microspheres removed from the bath are subjected to a heat stabilization treatment which comprises heating them in air at a temperature in the range of 200°–210° C. for 8 hours.

24. Microspheres according to claim 1, wherein the hollow microspheres are subjected to carbonization by heating the microspheres in a non-oxidizing atmosphere at a temperature and for a time which converts the polymer to carbon.

* * * * *